Patented Dec. 12, 1944

2,365,045

UNITED STATES PATENT OFFICE 2,365,045

PREPARATION OF HYDROGENATED GLYCERIDIC OIL

Casimer J. Borkowski, Chicago, and Jacob L. Schille, Berwyn, Ill., assignors, by mesne assignments, to The Best Foods, Inc., New York, N. Y., a corporation of New Jersey No Drawing. Application May 19, 1941, Serial No. 394,094

6 Claims. (Cl. 260—409)

This invention relates to the use of catalysts in the hydrogenation of vegetable oils or other glycerides and is a continuation-in-part of our application, Serial No. 342,446, filed June 26, 1940, now Patent No. 2,320,063.

In the preparation of vegetable oils, such, for example, as cottonseed oil for use as a margarine oil, it is desirable and necessary to carefully control the progress of the hydrogenation of the unsaturated oil so as to obtain a product having the desired physical characteristics. It has previously been proposed to use prepared nickel or nickel and copper catalysts in the hydrogenation of such oils. However, the procedures used in the preparation and use of such catalysts have presented certain difficulties and disadvantages and the amounts of such catalysts necessary for use in the hydrogenation have in some instances been such as to cause off odors and flavors and other undesirable effects in the oil. Also, the loss of active catalyst through difficulties in separating it from the oil and the necessity of alkali refining the filtered hydrogenated oil to remove catalyst retained in it have presented difficult problems in such operations.

It is an object of the present invention to provide an improved procedure for the use of active metal catalysts in the hydrogenation of glyceridic oils. It is a further object to provide means for removing soaps and other substances present or formed during the hydrogenation so as to allow the catalyst to act more freely and with less hindrance. It is also an object to provide means for removing colloidal (or very finely divided) particles of the nickel and other metal catalyst used. Other objects will become apparent.

We have found that by adding activated carbon, or other material having a high sorbtive (adsorptive or absorptive) value, to the oil before, during, or after the hydrogenation, a marked improvement in the hydrogenation may be obtained. It is preferred to add the sorbtive material before or during the hydrogenation, since it appears to remove from the zone of the reaction, by adsorption, soaps and other substances, present in the oil from previous treatment or formed during the hydrogenation, that interfere with the action of the catalyst during the hydrogenation. The addition of the sorptive material also assists in the removal of colloidally suspended particles of nickel or other metal catalyst and therefore permits of the use of a more finely divided and so more active catalyst in the hydrogenation without the necessity of subjecting the filtered hydrogenated oil to an alkali refining step in order to remove the metal catalyst in suspension in it. For this purpose, and for the bleaching and other refining action upon the oil, it may be added after the hydrogenation, although it is preferred to add it before the hydrogenation. For example, the catalyst and carbon may be mixed with the same or separate quantities of the oil to be hydrogenated and pumped into the oil to be hydrogenated, which preferably has been heated to about the reacting temperature of the hydrogenation. In using the term "colloidal" in the present specification, it is intended to include very finely divided particles of the catalyst that are difficult or impossible to remove by usual filtering operations.

By using the present invention, a catalyst as described in our patent No. 2,320,063 and having increased activity, may be used to advantage. For example, controlled proportions of water soluble salts of nickel and copper may be put into an aqueous solution in the proper proportions to give the desired catalyst and the metals may be coprecipitated in the cold (for example, at room temperatures) upon a carrier, preferably inert, such as kieselguhr (diatomaceous earth), by addition of a carbonate or bicarbonate, such for example as an alkali carbonate or bicarbonate or other suitable soluble carbonate or bicarbonate that will co-precipitate the metals, the carbonate being present preferably in stoichiometric proportions in relation to the metals to be precipitated. An amount of inert carrier such as to give a ratio of about 1 to 5 parts of carrier to 1 part of nickel (calculated as metallic nickel) is preferred. It is desirable to keep the amount of water in the solution as low as practicable so as to have the solution as saturated as practicable with carbon dioxide liberated by the reaction, in order to produce a more highly active catalyst.

The material may be then filtered and washed in a filter press preferably at a temperature of about 40 to 90° F., for one to two hours, and the washed product may be dried at temperatures below 200° F., and preferably at about 80 to 110° F., by passing a current of air or other gas at atmospheric pressure and at the proper temperature over the washed precipitate spread out on trays or pans. The resulting product is a complex mixture of compounds of copper and nickel, apparently including the hydrate, carbonate and bicarbonate. In this drying step it is desirable to avoid excessive temperatures, since such temperatures cause a densification of the product, apparently by a change in chemical composition by which carbon dioxide is removed, with an attendant reduction in the percentage of bicarbonate present. This is important since the activity of the reduced catalyst is enhanced by the high ratio of combined carbon dioxide in the precipitate. Low drying temperatures prevent loss of carbon dioxide.

After drying, the precipitate may be ground and mixed with an inert liquid vehicle of high boiling point and high flash point (such as a refined mineral oil, e. g., white mineral oil U. S. P.), preferably with a small and controlled amount of a fatty material or glyceridic oil (such as a refined vegetable or other glyceridic oil or the fatty acids thereof), and heated, with agitation, to about 300 to 360° F. in a closed kettle and in an atmosphere of nitrogen or other inert gas that is non-poisonous to the catalyst. The relative amounts of inert liquid vehicle and fatty material may be varied depending upon the type of catalyst desired. If the glyceridic oil alone is used, secondary reactions may take place and larger proportions of colloidal nickel will be formed. The addition of the mineral oil cuts down these secondary reactions and reduces the amount of colloidal nickel formed. For some purposes, the optimum proportion of the mineral oil is not less than about 7 parts by weight thereof to one part of nickel (as metallic nickel—in which amounts the material is quite doughy) and is preferably about 14 parts of said oil to one part of nickel. The optimum amounts of the fatty oil are about ½ to 1 part of the fatty oil to 1 part of nickel. For other purposes, however, smaller amounts of mineral oil may be desirable.

When the temperature has been elevated to the temperature indicated above, a rapid stream of hydrogen is passed, preferably continuously, through the mixture maintained at a temperature of about 340 to 380° F. (about 170 to 200° C.) for about 2 to 6 hours. A pressure in the kettle slightly above atmospheric is preferred, although higher or lower pressures may be used. The time of heating is preferably not over three hours, although the time required will depend upon the equipment used. It should be continued until no more moisture and/or carbon dioxide comes off and until little or no moisture and/or carbon dioxide remain in the mixture.

After the reduction of the catalyst is completed, the reduced catalyst is cooled to below 200° F. and may be used immediately in the procedure of the present invention or, if desired, it may be cooled to room temperature. If desired, part or all of the mineral oil can be removed from the reduced catalyst by filtration through a filter press or by other means. The resulting catalyst is brownish black in color and is in a very finely divided (colloidal) state and preferably contains copper and nickel in the proportions of about 1 to 2 parts of copper to 5 parts of nickel. Small percentages of other metals, such as cobalt or iron, or other impurities may also be present.

In utilizing the present invention, the active metal catalyst, prepared as described above, may be mixed with an activated vegetable carbon or other substance of high sorbent value, and used in the hydrogenation of unsaturated glyceridic oils, such as vegetable, animal or fish oils, at temperatures of 300 to 400° F. and hydrogen pressures of 1 to 100 pounds per square inch, and preferably of 2 to 20 pounds per square inch, to prepare products as described in the Vahlteich et al. Patents Nos. 2,047,530 and 2,167,113. The oil treated should be an oil containing little free fatty acids, i. e., preferably not over .05% of free fatty acids. It is desirable, therefore, to use an alkali refined oil.

The hydrogenation should be carried out with rapid agitation and the temperature is preferably maintained at about 350 to 380° F. Since the reaction is exothermic, cooling may be required to maintain this temperature after the reaction starts.

The hydrogenated oil may be filtered to completely remove the catalyst and the presence of the sorbent material assists in the removal of the finely divided nickel and copper and thus makes it possible to use a more finely divided and more active catalyst.

Satisfactory results may be obtained using a vegetable carbon, as hereinafter specified, in the proportions of about 10 to 20 times the weight of the nickel in the catalyst used. In some instances larger quantities may be desirable, the important consideration being to add sufficient to make the oil filter clear. With other sorbent substances, such as "acid" earths or bleaching earths, for example, fuller's earth, having less sorptive value, higher concentrations may be required. It is desirable to use carbon in particles as finely divided as practicable, since such carbon is more active and smaller quantities may be used, thus entailing less loss of oil by retention in the separated carbon.

The hydrogenation described above may be controlled to give a product of the desired characteristics and because of the greater selectivity and activity of the catalyst, made possible by the use of the sorptive material, a smaller quantity of the catalyst may be used and the hydrogenation may be conducted in less time and with less destructive effect upon the oil being hydrogenated, thus resulting in less production of free fatty acids in the hydrogenated products. Lower pressures may be used than those customary in the hydrogenation of vegetable oils under the same or similar conditions.

In the preparation of margarine oil as described in the above mentioned patents, the catalyst described above may be used in the proportions of about .003 to .05% of the catalyst, based upon the nickel in the catalyst, in relation to the total amount of oil to be hydrogenated. It is preferred to initially use about .02% of the catalyst and to reuse this quantity in the next batch with some slight additions of fresh catalyst as required. For example, in the preparation of margarine oil, an amount of catalyst corresponding to about .02% nickel may be added to the first batch of oil to be treated. After the hydrogenation the catalyst may be filtered off from the oil and added to the next batch of oil to be hydrogenated, together with about .004% of fresh or previously unused catalyst. Such additions of fresh catalyst may be continued with a removal of a like quantity of the used catalyst after the catalyst builds up to an optimum quantity, for instance, after three or four additions. Such reuse of the catalyst may go on indefinitely and, in plant operations, the average amount of nickel used normally ranges from .004 to .007% of nickel as catalyst, depending upon the number of batches of oil hydrogenated.

In the preparation of other hydrogenated fats where it is required to reduce the fats in iodin number to a very low degree of unsaturation, such as is represented by an iodin number of 2 or less, larger average amounts of nickel as catalyzer may be useful; for example, .05 to .08%, based upon the total amount of oil hydrogenated in a series of batches. In either event, the amount used is very much less than would be required with the usual procedures used in hydrogenating glyceridic oils. Greater amounts of the catalyst may, of course, be used if desired.

By controlling the relative amount of copper to nickel in the catalyst used in the hydrogenation, the character and extent of the hydrogenation may be governed. The copper is not as active a catalyst as the nickel, although a small amount of the copper has a marked accelerating effect upon the effectiveness of the catalyst. Also, it makes it possible to reduce the nickel catalyst at a lower temperature.

As a specific example of the procedure, about 58 pounds of nickel sulfate and 12 pounds of copper sulfate are dissolved in 300 pounds of cold water. To this is added 38 pounds of sodium carbonate dissolved in 150 pounds of water in a tank equipped with an agitator. After mixing for 30 minutes, 24 pounds of ditomaceous earth is added and the agitation continued for 15 minutes. The resulting precipitate is filtered and washed with cold water (40 to 90° F.) for one and one-half hours using a flow of water of about 5 gallons per minute. The precipitate is then dried at 100° F. with forced air circulation for approximately 48 hours. The yield is about 58 pounds of the precipitate and carrier. The dried precipitate and carrier is ground to a fineness of approximately 100 mesh. To 100 pounds of white mineral oil and 5 pounds of cottonseed oil, 28 pounds of the ground precipitate and carrier is added. The mixture is agitated and heated to about 340° F. while a stream of nitrogen is continually passing through it. When the temperature reaches about 340° F., the flow of nitrogen is stopped and a rapid stream of hydrogen passed through for about one hour. Then the temperature is raised to 380° F. and the reduction continued for two hours.

The resulting product is preferably cooled to 200° F. or below and mixed with a small portion of the oil to be hydrogenated. Activated carbon in the proportions of about 10 to 20 times the amount of nickel used is mixed with it and the resulting mixture is added to the oil to be hydrogenated. For example, 7000 pounds of cottonseed oil may be hydrogenated to an iodin number of 68.0 in 45 minutes at 10 pounds hydrogen pressure and at a temperature of 380° F., using a catalyst prepared as described above and containing .6 pounds of nickel and .15 pounds of copper (on a metal basis), and 14 pounds of activated carbon. The hydrogenated oil may be cooled to 150 to 200° F. and filtered in the usual manner, the filtered oil being clear, bright and free of metals and having a low fatty acid content (less than 0.05%). The separated catalyst may be reused as described.

By following the procedure described above, a margarine oil of the type described in Patents Nos. 2,047,530 and 2,167,113 may be produced and the catalyst resulting from the specific example given is particularly suited for the preparation of such a margarine oil. It is not intended, however, to limit the invention to the procedure of that example, which obviously may require alteration to meet particular requirements.

For example, the fineness of division of the particles of catalyst to be used may be controlled to give the optimum characteristics under the particular conditions of use. Increased fineness is advantageous in that the catalyst provides more surface area and is more active. However, increasing the fineness increases the difficulty of separation of the catalyst by filtration from the vegetable oil after being used as a catalyst in the hydrogenation. Thus a balance must be struck between these two opposed effects. For instance, a catalyst reduced in refined mineral oil without the addition of fatty oil will produce, upon reduction, a less finely divided or non-colloidal catalyst. This catalyst can be separated more readily by filtration after the hydrogenation, but it will have less selectivity and activity. The addition of a refined fatty oil, preferably in the proportions indicated above, will produce, upon reduction of the metal as described above, a highly selective and active catalyst that can be readily separated by the addition of sorbent carbon or other sorbent material.

The nickel and copper may be precipitated upon the carrier in the form of other salts or compounds capable of being precipitated on the carrier and that may be reduced with hydrogen. It is preferred to use salts or compounds that will be deposited in a finely subdivided form.

The finely divided nickel and copper are apparently adsorbed by the carbon and are removed with it in the filtering operation. This removal of the nickel and copper is very important because they have a deleterious effect upon the keeping qualities of the product as well as its flavor and odor. The addition of the carbon avoids the necessity of a subsequent alkali refining of the filtered oil to remove these substances.

The addition of carbon or other sorbent material to the catalyst during, before or after the hydrogenation may be utilized with other catalysts. For example, it may be used with a catalyst produced by the dry process in which the nickel (or a mixture of nickel and copper) is precipitated from a solution of a soluble nickel salt, such as nickel sulfate, (or a mixture of nickel and copper salts) by an alkali, such as caustic soda (preferably in the presence of an inert carrier) and the precipitate is dried, finely ground and passed dry through a tubular furnace in an atmosphere of hydrogen and at a temperature sufficiently high to reduce the nickel oxides, hydroxides and carbonates of the precipitate to active nickel. Upon completion of this reduction step, the reduced powder may be dropped into a suitable oil to avoid spontaneous combustion and the catalyst may be used as an oleaginous black paste or liquid. The carbon or other sorbtive material may be mixed with the catalyst in the paste or liquid or may be added to the oil to be hydrogenated, preferably before the hydrogenation.

This feature of adding the carbon or other sorbtive material may also be utilized to advantage in the preparation of the oleaginous black paste of the catalyst by other procedures. For example, by a procedure which comprises heating an organic salt of nickel, such as nickel formate (or mixture of suitable nickel and copper organic salts), in a suitable oil vehicle and at a temperature sufficiently high to decompose the nickel (or other metal) organic salt and leave active nickel. This procedure results in a finely divided active nickel that is likely to pass through the filtering medium into the filtered oil, thus resulting in loss of the most active catalytic material and requiring alkali refining of the hydrogenated oil. The addition of the activated carbon or other highly active sorbtive material, preferably before the hydrogenation, effectively retains the extremely finely divided active nickel catalyst, thus permitting a brilliant clear oil to be obtained by the usual filtration methods.

As an example of such a procedure, about 100 grams of powdered commercial nickel formate may be added to a blend of 238 grams of white mineral oil and 16 grams of refined cottonseed oil. If desired, a carrier, such as diatomaceous earth, may be added as described in the previous example. The mixture may then be agitated and heated to about 400 to 450° F. while a stream of nitrogen is continuously passed through it. This temperature of 400 to 450° F. is maintained for about 15 minutes, or until the first stage of the reduction reaction is completed. With a continuous flow of nitrogen still passing through the reaction mixture, the temperature may then be increased to about 500 to 550° F. and this temperature maintained for about 15 minutes, or until the reduction is completed. The resulting product may then be cooled to about 200 to 250° F. and mixed with an activated carbon sorbent in the proportions of 15 times the amount of nickel present. The mixture may be added to the oil to be hydrogenated and the hydrogenation carried out as described above. Or, and preferably, the reduced catalyst may be cooled to approximately 140° F. and mixed with a small portion of the oil to be hydrogenated. The activated carbon may be mixed with it and the resultant mixture may be added to the oil to be hydrogenated. With either of these procedures, using nickel alone, it is preferred to use a catalyst in the proportion of .02 to .05% of nickel based on the amount of oil to be hydrogenated. Such catalyst may, however, be reused as described above, to greatly reduce the average amount of catalyst used.

Variations may, of course, be made in the amounts of nickel formate, neutral white mineral oil and refined cottonseed oil used to prepare the catalyst described above in order to meet specific hydrogenation requirements. For example, satisfactory results may be obtained with a mixture of 71 parts of white mineral oil, 9 parts of cottonseed oil and 20 parts of catalyst based upon its nickel content (calculated as metallic nickel). Also, other variations may be made. For example, hydrogen may be used in addition to nitrogen during the decomposition of the organic salt; or hydrogen may be used to the exclusion of nitrogen. We prefer to use nitrogen because it is safer and because the hydrogen or other reducing gas produced in the reaction is sufficient without the addition of further hydrogen.

With a suitable organic copper salt, this procedure may be used to produce a catalyst that comprises a mixture of copper and nickel.

The use of sorbent carbon as described herein not only prevents the loss of finely divided nickel through the usual filtering media and avoids the necessity for re-refining the hydrogenated oil, but also results in a production of a hydrogenated oil which is distinctly more satisfactory for certain uses, such as a margarine oil, in that a better relation of melting point to setting point is obtained and in that the hydrogenation proceeds much more rapidly. It is also useful in the hydrogenation of other types of edible-fat products, such, for example, as in the preparation of shortening and other hydrogenated fats and oils. Various other oils, such as peanut oil, soya bean oil, corn oil, palm kernel oil, coconut oil, or animal or fish oils, may be used in utilizing the invention in the preparation of margarine oils, shortenings or other hydrogenated products. Carbons suitable for such uses are activated vegetable carbons having a high adsorptive capacity for catalytically active particles of nickel and/or other metals. It is preferable, if the carbon is to be added before or during the hydrogenation, that it have the capacity to simultaneously adsorb soaps present in the oils being hydrogenated. Carbons having the following characteristics have been found suitable: An apparent specific gravity of about .25 to .30; total ash on ignition, less than about 2%, preferably about 1.4 to 1.5%; soluble sulfates measured as $SO_3$, less than about .35%; a pH of about 6.6 to 7.4; free sulfur less than about 40 parts per million; and free from substances injurious to the catalyst. The carbon selected is preferably one that will filter clear and that will not leave substances having deleterious effects in subsequent treatments in the preparation of the finished oil. For example, it is preferably one that will not have an oxidizing effect upon the oil nor promote such an effect when the filtered oil is exposed to air or in the subsequent deodorizing operation. It is also preferably one that will not materially increase the free fatty acid content of the oil during the hydrogenation or the subsequent deodorizing operation.

By following a procedure as described above and using such a catalyst and carbon, a filtered oil free from catalyst and having the following characteristics was obtained:

(a) The oil filtered clear and bright in color (usually about 10.0Y 1.0R to 14.0Y 1.4R Lovibond).

(b) The free fatty acid of the filtered oil ran from .03 to .05% (on margarine oil or shortening).

(c) Such oil, when kept exposed to air and heated to 125° F. for 72 hours, did not increase over 1.0R in color reading (Lovibond).

(d) Such oil did not increase over an additional 0.4R in color when deodorized in the usual manner.

(e) Such oil did not increase the free fatty acid of the hydrogenated oil upon deodorization.

(f) Such oil contained less than 1 part of catalytic metal in 5 million parts of oil.

(g) Hydrogenation to the same iodin number of about 130,000 pounds of oil was accomplished with about 8 to 15 pounds of catalyst (from nickel formate or nickel-copper precipitation and calculated as metallic nickel) as compared with about 100 pounds of catalyst (calculated as nickel) according to prior practices.

By using the procedures described above, important savings in nickel or other catalytic metal are accomplished as compared with the amount of such metal used in other procedures. Many other variations may be made in the above procedure and it is not intended to restrict it to the particular proportions, temperatures, times, etc. given as illustrative. For example, instead of the diatomaceous earth used as the carrier for the catalyst, other carriers may be used, such, for example, as fuller's earth or finely divided carbon.

The carbon, fuller's earth, etc. added to assist in the separation of metals, and the diatomaceous earth or other substance used as a carrier, should be free from impurities, such as sulfur, phosphorus, caustic and acid, and from other impurities or deleterious substances that would poison the catalyst. The gases used in preparing the catalyst or in the hydrogenation also should be free from those substances or from other substances that would poison the catalyst, such, for example, as carbon monoxide, oxygen, hydrogen sulfide, mercaptans, arsine, phosphine, etc.

The agitation of the oil during the hydrogenation is preferably by mechanical means, such as rapidly rotating stirrers. Other means may, however, be used, such as bubbling gas through the oil or by pumping the oil over a stationary catalyst.

The terms used in describing the invention have been used as terms of description and not as terms of limitation and it is intended to include within the scope of the appended claims all equivalents of the terms used. In using the term fatty material, it is intended to include fatty acids as well as fatty oils. Also, it is appreciated that a substance having a beneficial effect may be included with the inert carrier, vehicle or gas referred to herein and in using the term inert it is intended to exclude substances which would have a detrimental effect upon the intended reactions, but not to preclude the inclusion of substances which may be active but which do not have a detrimental effect. The active nickel catalyst resulting from the reduction of the nickel salt (with or without copper) probably is not composed entirely of metallic nickel, and in using the term active metal or active nickel in the appended claims, it is not intended to restrict the claims to a substance consisting entirely of the metallic metal.

We claim:

1. In the preparation of a hydrogenated glyceridic oil, the steps of exposing a vegetable oil to hydrogen at hydrogenation temperatures in the presence of an active nickel catalyst prepared by reducing a compound of nickel to active nickel in a mixture composed principally of a mineral oil vehicle and a smaller proportion of a fatty material, filtering to separate the catalyst from the hydrogenated oil and adding to the oil before said filtering operation a finely divided active carbon having an apparent specific gravity of not more than .30, a pH of 6.6 to 7.4 and less than 40 parts per million of free sulfur.

2. In the preparation of a hydrogenated glyceridic oil, the steps of exposing a vegetable oil to hydrogen at hydrogenation temperatures in the presence of an active nickel catalyst prepared by reducing a compound of nickel to active nickel in a mixture composed principally of a mineral oil vehicle and a smaller proportion of a fatty material, filtering to separate the catalyst from the hydrogenated oil and adding to the oil before said filtering operation a finely divided active carbon having an apparent specific gravity of not more than .30, a pH of 6.6 to 7.4 and less than 40 parts per million of free sulfur, the amount of said finely divided active carbon added being 10 to 20 times the amount of nickel present in said catalyst.

3. A method of hydrogenating glyceridic oil comprising reducing a compound of nickel to active nickel in a mixture composed principally of a mineral oil vehicle and a smaller proportion of a fatty material, adding the reduced active nickel to the oil to be hydrogenated, and adding to the oil prior to hydrogenation a finely divided active carbon having an apparent specific gravity of not more than .30, a pH of 6.6 to 7.4 and less than 40 parts per million of free sulfur.

4. In the prepartion of a hydrogenated glyceridic oil, the steps of exposing a vegetable oil to hydrogen at hydrogenation temperatures in the presence of a catalyst prepared by reducing coprecipitated compounds of nickel and copper to form active nickel in a mixture composed principally of a mineral oil vehicle and a smaller proportion of a fatty material, filtering to separate the catalyst from the oil and adding to the oil before said filtering operation a finely divided active carbon having an apparent specific gravity of not more than .30, a pH of 6.6 to 7.4 and less than 40 parts per million of free sulfur.

5. A method of hydrogenating glyceridic oils comprising precipitating carbonates of nickel and copper, separating and drying the precipitate at a temperature not over about 110° F., heating the precipitate in a mixture of white mineral oil and a smaller proportion of fatty material and in intimate contact with an inert gas to above about 300° F., thereafter reducing the mixture with hydrogen while maintaining it at a temperature between about 300 and 400° F., adding to the glyceridic oil to be hydrogenated the reduced mixture of metal catalyst and an active carbon having an apparent specific gravity of not more than .30, a pH of 6.6 to 7.4 and less than 40 parts per million of free sulfur, and filtering to separate the catalyst and carbon from the oil.

6. A method of hydrogenating glyceridic oils comprising reducing an organic compound of nickel to active nickel by heating it to decompose the organic compound and leave active nickel in a mixture composed principally of a mineral oil vehicle and a smaller proportion of fatty material, adding the reduced active nickel to the oil to be hydrogenated, adding to the oil a finely divided active carbon having an apparent specific gravity of not more than .30, a pH of 6.6 to 7.4 and less than 40 parts per million of free sulfur, exposing the mixture to hydrogen and hydrogenating temperatures and filtering the catalyst and carbon from the oil.

CASIMER J. BORKOWSKI.
JACOB L. SCHILLE.